United States Patent
Minase et al.

(10) Patent No.: US 12,371,005 B2
(45) Date of Patent: Jul. 29, 2025

(54) PARKING CONTROL APPARATUS

(71) Applicant: TOYOTA JIDOSHA KABUSHIKI KAISHA, Toyota (JP)

(72) Inventors: Yuki Minase, Toyota (JP); Motonari Obayashi, Nagakute (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 236 days.

(21) Appl. No.: 18/119,614

(22) Filed: Mar. 9, 2023

(65) Prior Publication Data
US 2023/0294668 A1 Sep. 21, 2023

(30) Foreign Application Priority Data
Mar. 18, 2022 (JP) .................................. 2022-044425

(51) Int. Cl.
*B60W 30/06* (2006.01)
*B60R 1/26* (2022.01)
*G06V 20/58* (2022.01)

(52) U.S. Cl.
CPC ............... *B60W 30/06* (2013.01); *B60R 1/26* (2022.01); *G06V 20/586* (2022.01); *B60R 2300/607* (2013.01); *B60R 2300/806* (2013.01); *B60W 2420/403* (2013.01)

(58) Field of Classification Search
CPC ... B60W 30/06; B60W 2420/403; B60R 1/26; B60R 2300/607; B60R 2300/806; G06V 20/58
USPC ......................................................... 701/41
See application file for complete search history.

(56) References Cited

U.S. PATENT DOCUMENTS

| | | | |
|---|---|---|---|
| 9,522,661 B2 | 12/2016 | Inoue et al. | |
| 9,604,638 B2 | 3/2017 | Kiyokawa et al. | |
| 9,738,276 B2 | 8/2017 | Kiyokawa et al. | |
| 9,828,028 B2 | 11/2017 | Ishijima et al. | |
| 9,836,658 B2 | 12/2017 | Kiyokawa et al. | |
| 9,875,655 B2 | 1/2018 | Kiyokawa et al. | |
| 10,031,227 B2 | 7/2018 | Kiyokawa et al. | |
| 10,150,486 B2 | 12/2018 | Hoshino et al. | |
| 10,239,520 B2 | 3/2019 | Tomozawa et al. | |
| 10,377,416 B2 | 8/2019 | Fukukawa et al. | |
| 10,766,484 B2 * | 9/2020 | Bae .......................... | G08G 1/14 |

(Continued)

FOREIGN PATENT DOCUMENTS

| | | |
|---|---|---|
| JP | 2008-207726 A | 9/2008 |
| KR | 101959307 B1 * | 7/2019 |

*Primary Examiner* — Peter D Nolan
(74) *Attorney, Agent, or Firm* — Sughrue Mion, PLLC

(57) ABSTRACT

A parking control apparatus includes a control unit capable of executing backward parking assist control based on surrounding information. In a case when a parking space is detected, when a specific condition to be satisfied when the parking space has a relatively narrow width is satisfied, the control unit executes guidance control as the backward parking assist control. The guidance control is control for moving a vehicle from a current position to a guidance target position in front of the parking space, so that the vehicle stops at the guidance target position in a posture in which: a vehicle's longitudinal axis is parallel to a long-side direction of the parking space; a vehicle's width is included in the width of the parking space when viewed from front; and the parking space is in closer proximity to a rear end portion than to a front end portion of the vehicle.

6 Claims, 9 Drawing Sheets

(56) References Cited

U.S. PATENT DOCUMENTS

| | | | |
|---|---|---|---|
| 2010/0019935 A1 | 1/2010 | Kawabata et al. | |
| 2010/0254034 A1* | 10/2010 | Chiu | B60R 1/072 |
| | | | 359/843 |
| 2019/0329760 A1* | 10/2019 | Harase | B60W 30/06 |
| 2020/0031283 A1* | 1/2020 | Nakasho | G08G 1/16 |
| 2021/0409379 A1* | 12/2021 | Hwang | G08G 1/0112 |

* cited by examiner

PARKING CONTROL APPARATUS

BACKGROUND OF THE INVENTION

1. Field of the Invention

The present invention relates to a parking control apparatus capable of executing parking control including backward parking assist control for assisting a driver of a vehicle in parking the vehicle backward in a parking space.

2. Description of the Related Art

Hitherto, there has been known a parking control apparatus mounted to a vehicle, which detects a parking space (space having a shape and a size that enable the vehicle to be parked therein) based on surrounding information acquired from surrounding sensors such as an image pickup device (typically, camera sensor) and a 3D object information acquisition device (typically, clearance sonar) and can execute parking control including control for parking the vehicle backward in the detected parking space. When the parking control apparatus detects the parking space, the parking control apparatus calculates a movement route from a current position to a target parking position based on the surrounding information, and moves the vehicle along the movement route.

In general, surrounding sensors are not so high in detection accuracy. Thus, when a parking space (for example, parking space in a mechanical parking lot) has a relatively narrow width, there is a possibility that a vehicle may fail to be appropriately parked in the parking space due to variations in the detection accuracy of those sensors.

In view of this, the parking control apparatus is configured to avoid executing the parking control when, even upon detection of a parking space, the parking space has a relatively narrow width (see, for example, Japanese Patent Application Laid-open No. 2008-207726).

However, when a driver parks a vehicle in a parking space having a relatively narrow width by his or her own parking operation, the driver is required to carefully perform the parking operation in order to move the vehicle to the parking space without bringing the vehicle into contact with surrounding obstacles, and feels a heavy burden in a series of operations. In consideration that the parking control has been originally developed for the purpose of reducing or eliminating the burden on drivers in the parking operation, such a parking operation for the parking space having a relatively narrow width is most desired to be assisted by some kind of parking control.

SUMMARY OF THE INVENTION

The present invention has been made in order to address the above-mentioned problem. That is, one of objects of the present invention is to provide a parking control apparatus capable of greatly reducing a burden on a driver in parking a vehicle backward in a parking space having a relatively narrow width without introducing an image pickup device or 3D object information acquisition device having higher detection accuracy.

According to at least one embodiment of the present invention, there is provided a parking control apparatus (hereinafter referred to as "apparatus according to at least one embodiment of the present invention") including: an image pickup device (11) configured to capture an image of surroundings of a vehicle; a 3D object information acquisition device (12) configured to acquire information on a 3D object present in the surroundings of the vehicle as 3D object information; and a control unit (10) configured to: detect a parking space (30, 50, 60), which is a space having a shape and a size that enable the vehicle to be parked therein, based on surrounding information including: image information including image data obtained by capturing the image by the image pickup device (11); and the 3D object information; and execute parking control including backward parking assist control for assisting a driver of the vehicle in parking the vehicle backward in the detected parking space (30, 50, 60). The control unit (10) is configured to: determine, when the parking space (30, 50, 60) is detected, whether a specific condition to be satisfied when the parking space has a relatively narrow width (w) is satisfied (Step 1310, Step 1320, and Step 1430); and execute, when the control unit has determined that the specific condition is satisfied (Yes in Step 1310, Yes in Step 1320, and Yes in Step 1430), guidance control as the backward parking assist control based on the surrounding information, the guidance control being control for moving the vehicle from a current position to a guidance target position (Pg), which is a position in front of the detected parking space (30, 60), so that the vehicle stops at the guidance target position (Pg) in a posture in which: a longitudinal axis of the vehicle is parallel to a long-side direction of the detected parking space (30, 60); a width of the vehicle is included in the width of the detected parking space when viewed from front; and the detected parking space is in closer proximity to a rear end portion of the vehicle than to a front end portion of the vehicle.

In the apparatus according to at least one embodiment of the present invention, when the parking space is detected based on the surrounding information, it is determined whether or not the specific condition (condition to be satisfied when the parking space has a relatively narrow width) is satisfied. When it is determined that the specific condition is satisfied, the guidance control for moving the vehicle from the current position to the guidance target position (position in front of the parking space) is executed as the backward parking assist control. Under the guidance control, the vehicle stops at the guidance target position in a posture in which: the longitudinal axis of the vehicle is parallel to the long-side direction of the parking space; the width of the vehicle is included in the width of the parking space when viewed from front; and the parking space is in closer proximity to the rear end portion of the vehicle than to the front end portion of the vehicle. This enables the driver to park the vehicle in the parking space only by reversing the vehicle while finely adjusting the posture of the vehicle by a steering operation. In this manner, when the detected parking space has a relatively narrow width, instead of avoiding the execution of the parking control, the apparatus according to at least one embodiment of the present invention executes, as the backward parking assist control, the guidance control for moving the vehicle to a position (that is, guidance target position) from which the driver can park the vehicle only by performing a simple parking operation. With this configuration, it is possible to greatly reduce a burden on the driver in parking the vehicle backward in a parking space having a relatively narrow width without introducing an image pickup device or 3D object information acquisition device having higher detection accuracy.

In at least one aspect of the present invention, the control unit (10) is configured to execute, when the control unit has determined that the specific condition is not satisfied (No in Step 1320, and No in Step 1430), as the parking control, control for moving the vehicle from the current position to a target parking position (Pp), which is a position in the detected parking space (50), based on the surrounding information.

When the parking space has a relatively wide width, the parking control enables the vehicle to be appropriately moved to the target parking position (position in the parking space) even without an image pickup device or 3D object information acquisition device having higher detection accuracy. In this manner, the kind of parking control is switched based on whether or not the specific condition is satisfied, to thereby be able to execute appropriate parking control corresponding to the width of the parking space.

In at least one aspect of the present invention, the control unit (10) is configured to: determine, based on at least the image information, whether the detected parking space (30, 50, 60) is a mechanical parking space (30), which is a parking space in a mechanical parking lot (Step 1310); and determine that the specific condition is satisfied when the control unit has determined that the detected parking space is the mechanical parking space (Yes in Step 1310).

In general, a parking space in a mechanical parking lot has a narrow width, and obstacles such as poles are often installed in the surroundings of the parking space. With the apparatus according to at least one embodiment of the present invention, the guidance control is executed when the detected parking space is a mechanical parking space, and hence it is possible to greatly reduce the burden on the driver in parking the vehicle backward in the parking space.

In at least one aspect of the present invention, the control unit (10) is configured to: determine, when the control unit has determined that the detected parking space (30, 50, 60) is not the mechanical parking space (No in Step 1310), based on at least the image information, whether the detected parking space (50, 60) has a width (w) equal to or smaller than a predetermined width threshold value (wth) (Step 1320); and determine that the specific condition is satisfied when the control unit has determined that the detected parking space has a width equal to or smaller than the predetermined width threshold value (Yes in Step 1320).

With this configuration, even in a case in which the detected parking space is not a mechanical parking space, the guidance control is executed when the parking space has a width equal to or smaller than the width threshold value, and hence it is possible to greatly reduce the burden on the driver in parking the vehicle backward in the parking space.

In at least one aspect of the present invention, the parking control apparatus further includes a display screen (25a), and the control unit (10) is configured to: generate, during a period in which the vehicle is reversing at a speed equal to or lower than a predetermined speed threshold value, a rearward image including a rearward area of the vehicle based on the image information, and display the rearward image in a predetermined first area (A1) of the display screen (25a); and execute, in a first case (Yes in Step 1340) in which the vehicle has started to reverse from the guidance target position (Pg) by a parking operation of the driver after execution of the guidance control due to satisfaction of the specific condition (Step 1330), see-through display control as the backward parking assist control, the see-through display control being control for generating a composite rearward image (I3st) obtained by compositing the rearward image and an image including a transparency-processed vehicle rear portion (Vr), which is formed of the rear end portion (Br) and rear wheels (Wr) of the vehicle, and displaying the composite rearward image (I3st) in the predetermined first area (A1) in place of the rearward image (Step 1345).

With this configuration, in the case in which the vehicle has started to reverse from the guidance target position by the parking operation of the driver after the execution of the guidance control due to the satisfaction of the specific condition, the see-through display control for displaying the composite rearward image on the display screen in place of the rearward image is executed as the backward parking assist control. The composite rearward image includes the transparency-processed vehicle rear portion. Thus, the driver can visually recognize an area immediately below the vehicle rear portion by referring to the composite rearward image, to thereby be able to examine the position of the rear wheels of the vehicle and a surrounding situation thereof. As a result, it is possible to further reduce the burden on the driver in parking the vehicle backward in the parking space having a relatively narrow width.

In at least one aspect of the present invention, the control unit (10) is configured to: generate, during the period in which the vehicle is reversing at a speed equal to or lower than the predetermined speed threshold value, an overhead view image (I2) obtained by superimposing a vehicle plane image on an image of a surrounding area of the vehicle that appears as being viewed from directly above, based on the image information, and display the overhead view image in a predetermined second area (A2) of the display screen (25a); and further execute, in the first case (Step 1340), as the see-through display control, control for generating a transparent vehicle overhead view image (I2st), which is the overhead view image (I2) having the vehicle plane image transparency-processed, and displaying the transparent vehicle overhead view image in the predetermined second area (A2) in place of the overhead view image (Step 1345).

According to the at least one aspect of the present invention, in the case in which the vehicle has started to reverse from the guidance target position by the parking operation of the driver after the execution of the guidance control due to the satisfaction of the specific condition, the control for displaying the transparent vehicle overhead view image on the display screen in place of the overhead view image is executed as the see-through display control. The transparent vehicle overhead view image includes the transparency-processed vehicle plane image. Thus, the driver can visually recognize the area immediately below the vehicle by referring to the transparent vehicle overhead view image, to thereby be able to examine the relative position of the rear wheels in the parking space and the like. As a result, it is possible to further reduce the burden on the driver in parking the vehicle backward in the parking space having a relatively narrow width.

In at least one aspect of the present invention, the parking control apparatus further includes a display screen (25a), and the control unit (10) is configured to: generate, during a period in which the vehicle is reversing at a speed equal to or lower than a predetermined speed threshold value, an overhead view image (I2) obtained by superimposing a vehicle plane image on an image of a surrounding area of the vehicle that appears as being viewed from directly above, based on the image information, and display the overhead view image in a predetermined second area (A2) of the display screen (25a); and execute, in a case in which the vehicle has started to reverse from the guidance target position by a parking operation of the driver after execution of the guidance control due to satisfaction of the specific condition (Step 1340), enlarged display control as the backward parking assist control with a change of door mirrors of the vehicle from an open state to a closed state as a trigger (Yes in Step 1350), the enlarged display control being control for generating an enlarged overhead view image (I2mag), which is an image obtained by enlarging the vehicle plane image and a vicinity thereof by increasing a display magnification of the overhead view image (I2), and displaying the enlarged overhead view image in the predetermined second area (A2) in place of the overhead view image.

According to the at least one aspect of the present invention, in the case in which the vehicle has started to reverse from the guidance target position by the parking operation of the driver after the execution of the guidance control due to the satisfaction of the specific condition, the enlarged display control for displaying the enlarged overhead view image on the display screen in place of the overhead view image is executed as the backward parking assist control with the change of the door mirrors of the vehicle from the open state to the closed state as a trigger. The enlarged overhead view image is the image obtained by enlarging the vehicle and the vicinity thereof. Thus, the driver can examine the situation on the sides of the vehicle in the parking space by referring to the enlarged overhead view image. This enables the driver to perform the parking operation without feeling a heavy burden even when the situation on the sides of the vehicle can no longer be examined through use of the door mirrors.

In the description above, in order to facilitate understanding of the invention, reference symbols used in at least one embodiment of the present invention are enclosed in parentheses, and are assigned to each of constituent features of the invention corresponding to the at least one embodiment. However, each of the constituent features of the invention is not limited to those of the at least one embodiment prescribed by the reference symbols.

DESCRIPTION OF THE EMBODIMENTS

Embodiment

Figure 1:
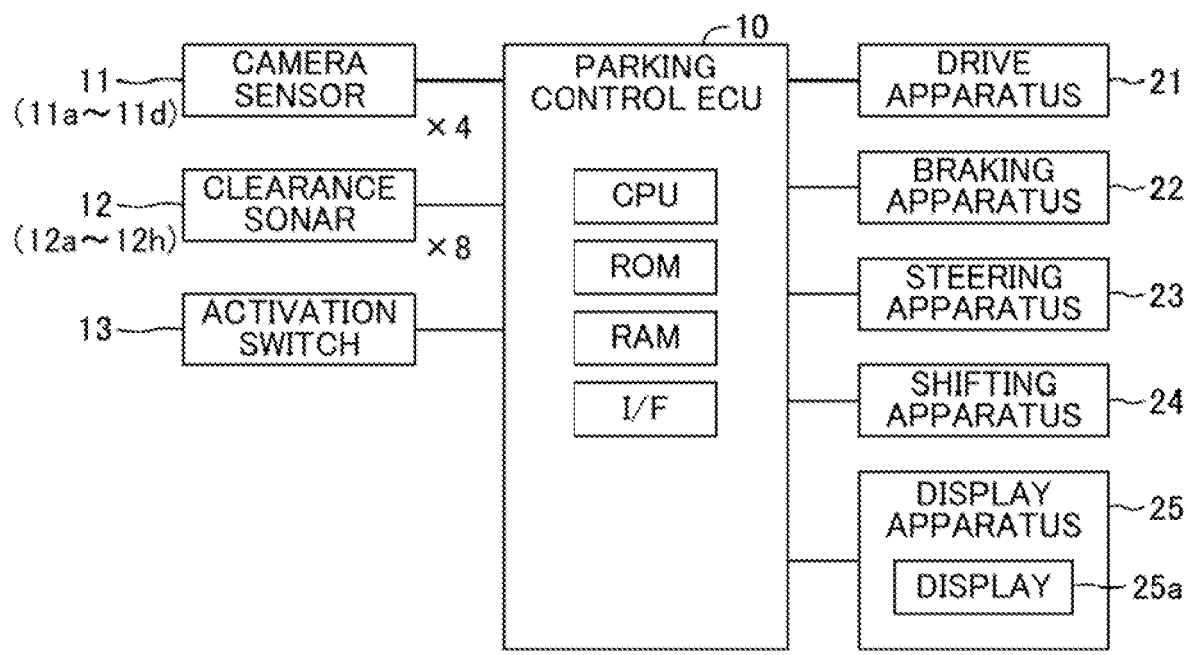
FIG. 1 is a schematic configuration diagram of a parking control apparatus according to at least one embodiment of the present invention.

Now, a parking control apparatus according to at least one embodiment of the present invention (hereinafter also referred to as "the apparatus according to the at least one embodiment") is described with reference to the accompanying drawings. As illustrated in FIG. 1, the apparatus according to the at least one embodiment includes: a parking control ECU 10; and a camera sensor 11, a clearance sonar 12, an activation switch 13, a drive apparatus 21, a braking apparatus 22, a steering apparatus 23, a shifting apparatus 24, and a display apparatus 25, which are connected to the parking control ECU 10. The parking control ECU 10 includes a microcomputer as a principal component. The ECU is an abbreviation for "electronic control unit." The microcomputer includes, for example, a CPU, a ROM, a RAM, and an interface (I/F), and the CPU is configured to execute instructions (programs and routines) stored in the ROM to implement various functions. Some of those functions may be executed by another ECU (not shown). A vehicle to which the apparatus according to the at least one embodiment is mounted is hereinafter referred to as "own vehicle."

The parking control ECU 10 is configured to acquire information transmitted by the camera sensor 11 and the clearance sonar 12 and a signal generated by the activation switch 13 every time a predetermined time period has elapsed and control the drive apparatus 21, the braking apparatus 22, the steering apparatus 23, the shifting apparatus 24, and the display apparatus 25 based on the acquired signal. The parking control ECU 10 is hereinafter also referred to simply as "ECU 10."

The camera sensor 11 (image pickup device) includes a camera sensor 11a provided at a central portion of a front end of the own vehicle, a camera sensor 11b provided at a central portion of a rear end of the own vehicle, a camera sensor 11c provided at a lower portion of a right side mirror, and a camera sensor 11d provided at a lower portion of a left side mirror. Each of the camera sensors 11a to 11d has basically the same configuration except that imaging ranges thereof are different from one another.

The camera sensor 11a captures an image of a forward area of the own vehicle, and the camera sensor 11b captures an image of a rearward area of the own vehicle. The camera sensor 11c captures an image of a rightward area of the own vehicle, and the camera sensor 11d captures an image of a leftward area of the own vehicle. The camera sensors 11a to 11d transmit forward image data, rearward image data, rightward image data, and leftward image data, which have been obtained by capturing the images, to the ECU 10, respectively. Information including the forward image data, the rearward image data, the rightward image data, and the leftward image data is hereinafter referred to as "image information." The number and mounting positions of the camera sensors 11 are not limited to those described above.

The ECU 10 generates, based on the image information, an image of a surrounding area of the own vehicle that appears as being viewed from directly above. Then, a plane image of the vehicle stored in advance in a ROM of the ECU 10 is superimposed on the generated image, to thereby generate an overhead view image. The ECU 10 displays the generated overhead view image on a display 25a of the display apparatus 25 under a predetermined condition (described later).

The ECU 10 generates, based on the image information, an image of surroundings of the own vehicle as viewed from a virtual viewpoint set at a freely-set position in the surroundings of the own vehicle. Then, a polygon representing a shape of the vehicle as viewed from the virtual viewpoint is superimposed on the generated image, to thereby generate a virtual viewpoint image. The ECU 10 displays the generated virtual viewpoint image on the display 25a under a predetermined condition (described later).

The ECU 10 generates a traveling direction image for displaying an area in a traveling direction of the own vehicle based on the forward image data or the rearward image data included in the image information. Specifically, when the own vehicle is moving forward or stops moving forward, the ECU 10 generates a traveling direction image for showing the forward area of the own vehicle based on the forward image data. Meanwhile, when the own vehicle is reversing or stops reversing, the ECU 10 generates a traveling direction image for showing the rearward area of the own vehicle based on the rearward image data. The ECU 10 displays one of those traveling direction images on the display 25a under a predetermined condition depending on a driving situation of the own vehicle (described later). The traveling direction image for showing the rearward area of the own vehicle corresponds to an example of a "rearward image."

The clearance sonar 12 (3D object information acquisition device) transmits ultrasonic waves to a predetermined range, and receives reflected waves reflected by a 3D object. Then, a distance from the own vehicle to the 3D object and an azimuth of the 3D object with respect to the own vehicle (information regarding the 3D object) are calculated based on a time period from transmission of the ultrasonic waves to reception thereof, and results of the calculation are acquired as 3D object information (in other words, the 3D object is detected).

The clearance sonar 12 includes four clearance sonars 12a to 12d provided in a front end portion of the own vehicle and four clearance sonars 12e to 12h provided in a rear end portion of the own vehicle. The clearance sonars 12a and 12b are provided at a front right corner portion and a front left corner portion of the own vehicle, respectively. The clearance sonars 12c and 12d are provided at positions equidistant from the central portion of the front end of the own vehicle in a vehicle width direction. The clearance sonars 12e and 12f are provided at a rear right corner portion and a rear left corner portion of the own vehicle, respectively. The clearance sonars 12g and 12h are provided at positions equidistant from the central portion of the rear end of the own vehicle in the vehicle width direction.

The clearance sonars 12a, 12b, 12e, and 12f are configured to detect 3D objects positioned farther from the vehicle compared to the clearance sonars 12c, 12d, 12g, and 12h. The clearance sonars 12a, 12b, 12e, and 12f have basically the same configuration except that detection ranges for the 3D objects are different from one another. The clearance sonars 12c, 12d, 12g, and 12h have basically the same configuration except that detection ranges for the 3D objects are different from one another.

The clearance sonars 12a to 12d acquire the 3D object information on the 3D objects present in a right oblique forward area, a left oblique forward area, a right-side forward area, and a left-side forward area of the own vehicle, respectively, and transmit the acquired 3D object information to the ECU 10. The clearance sonars 12e to 12h acquire the 3D object information on the 3D objects present in a right oblique rearward area, a left oblique rearward area, a right-side rearward area, and a left-side rearward area of the own vehicle, respectively, and transmit the acquired 3D object information to the ECU 10. The number and mounting positions of the clearance sonars 12 are not limited to those described above.

The image information and the 3D object information may be hereinafter referred to collectively as "surrounding information."

The ECU 10 detects, based on the surrounding information, a parking space having a shape and a size that enable the own vehicle to be parked therein. The parking space can be detected based on, for example, division lines or a pallet included in the image information or 3D objects (obstacles) such as side walls and poles included in the 3D object information. In this case, the pallet refers to a metal stand for placing a vehicle thereon, which is installed in a parking space in a mechanical parking lot.

The ECU 10 is configured to be capable of executing parking control including automatic backward parking control and backward parking assist control. The automatic backward parking control is control for automatically parking the own vehicle backward in a parking space (in a direction of entering the parking space from the rear end portion of the own vehicle), and the parking assist control is control for assisting a driver in parking the own vehicle backward in the parking space. In other words, the automatic backward parking control is parking control in which the ECU 10 performs drive control, braking control, steering control, and shift control to automatically move the own vehicle from a current position to a target parking position in the parking space without requiring the driver to perform a parking operation. Meanwhile, the backward parking assist control includes guidance control, see-through display control, and enlarged display control, which are described later, and is parking control for assisting, by those kinds of control, the driver in the parking operation for moving the own vehicle from the current position to the target parking position.

The parking control may include automatic forward parking control for automatically parking the own vehicle forward in the parking space and forward parking assist control for assisting the driver in parking the own vehicle forward. The parking control may also include parking assist control in which the ECU 10 assists the driver in the parking operation by performing at least one of the drive control, the braking control, the steering control, or the shift control. The parking control may further include control for automatic parallel parking or control for assisting the driver in parallel parking.

The activation switch 13 is a switch to be pressed (operated) by the driver to activate or deactivate a system for executing the parking control (hereinafter referred to as "parking control system").

The drive apparatus 21 is an apparatus for applying a drive force for causing the own vehicle to travel to drive wheels thereof. The ECU 10 controls the drive force to be applied to the drive wheels by performing drive control for controlling an operation of the drive apparatus 21. The type of the own vehicle is not particularly limited, and the own vehicle may be, for example, an engine vehicle, a hybrid electric vehicle (HEV), a plug-in hybrid electric vehicle (PHEV), a fuel cell electric vehicle (FCEV), or a battery electric vehicle (BEV).

The braking apparatus 22 is an apparatus for applying a braking force for braking the own vehicle to wheels thereof. The ECU 10 controls the braking force to be applied to the wheels by performing braking control for controlling an operation of the braking apparatus 22.

The steering apparatus 23 is an apparatus for applying a steering torque for steering steered wheels of the own vehicle to a steering mechanism (not shown). The ECU 10 controls the steering torque to be applied to the steering mechanism (by extension, a steered angle of the steered wheels) by performing steering control for controlling an operation of the steering apparatus 23.

The shifting apparatus 24 is an apparatus for operating a transmission and/or a driving direction switching mechanism of the own vehicle in accordance with a position (typically, "D", "R", "P", and the like) of a shift lever (not shown). The ECU 10 performs shift control for controlling an operation of the shift apparatus 24 to automatically switch the position of the shift lever and control the transmission and/or the driving direction switching mechanism.

Figure 2:
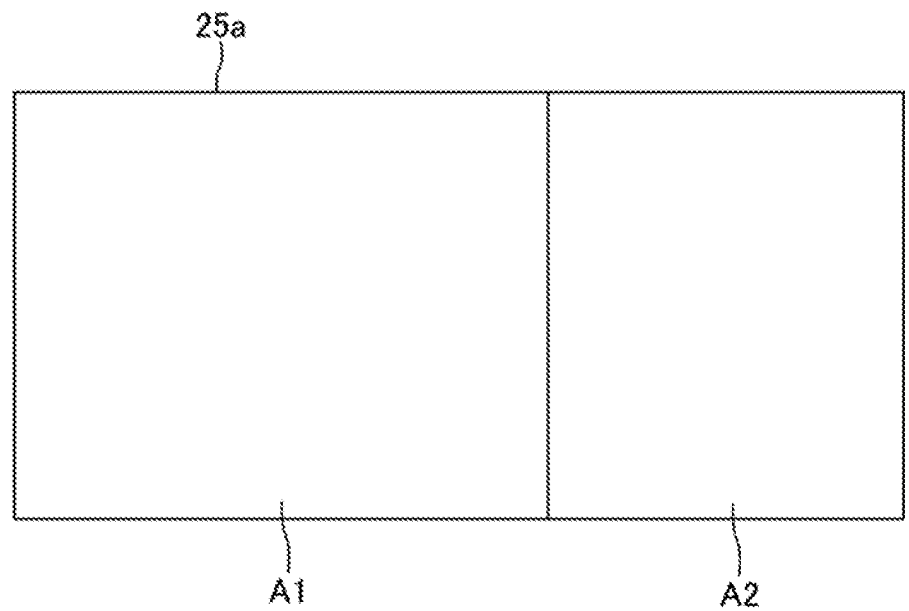
FIG. 2 is a view for illustrating a layout of a display area of a display screen.

The display apparatus 25 includes the display 25a (display screen) provided at a position visually recognizable by the driver. The display apparatus 25 is typically a display apparatus provided to a navigation system, and a touch panel can be used for the display 25a. As illustrated in FIG. 2, the display 25a is formed of a display area A1 (first area) provided on a left side and a display area A2 (second area) provided on a right side. In the display area A1, the virtual viewpoint image or the traveling direction image can be displayed. In the display area A2, the overhead view image can be displayed. The ECU 10 controls the display apparatus 25 to display images corresponding to a control stage of the parking control system in the display areas A1 and A2 of the display 25a.

(Details of Operation)

Next, details of an operation of the ECU 10 are described. When a speed of an own vehicle V is equal to or lower than a predetermined speed threshold value, the ECU 10 searches for a parking space based on the surrounding information. When the driver wishes execution of the automatic backward parking control or the backward parking assist control for a certain parking space, the driver pulls up the own vehicle V alongside an area in front of the parking space (that is, stops the own vehicle so that a longitudinal axis of the own vehicle V is substantially perpendicular to a long-side direction of the parking space), and presses the activation switch 13. When the activation switch 13 is pressed, the ECU 10 activates the parking control system. When the own vehicle V is pulled up, the driver stops the own vehicle V by stepping on a brake pedal. That is, the position of the shift lever is maintained at "D".

Figure 3:
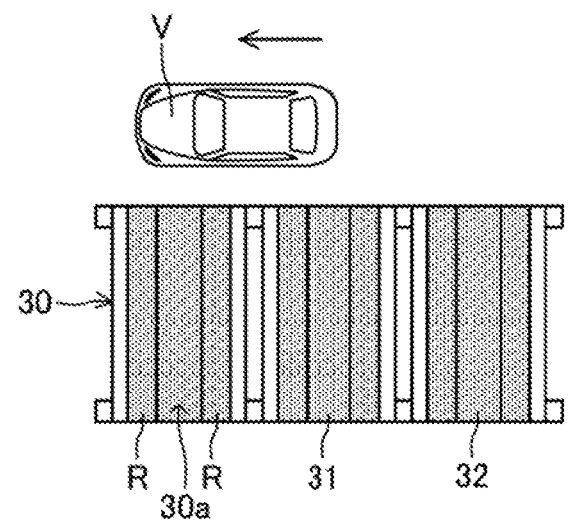
FIG. 3 is a view for illustrating an example of a scene in which a parking control system is activated near a mechanical parking lot.

FIG. 3 is a view for illustrating an example of a scene in which the parking control system is activated. In the example of FIG. 3, the driver wishes to park the own vehicle V in a parking space 30 in a mechanical parking lot through use of the parking control system. In this case, the driver pulls up the own vehicle V alongside an area in front of the parking space 30, and presses the activation switch 13. Then, the ECU 10 activates the parking control system.

The parking space 30 is provided with a rectangular pallet 30a. The pallet 30a includes rails R on both sides in a short-side direction (width direction) thereof. The rails R are each a groove extending in a long-side direction (depth direction) thereof, and each have a width wider than that of a general wheel. With the wheels rolling along the rails R, the vehicle is allowed to enter the parking space 30 in an appropriate posture. Configurations of parking spaces 31 and 32 are the same as the configuration of the parking space 30. In FIG. 3, only the parking spaces 30 to 32 on the ground floor of a mechanical parking lot are shown, and parking spaces on the second and higher floors are not shown.

Figure 4:
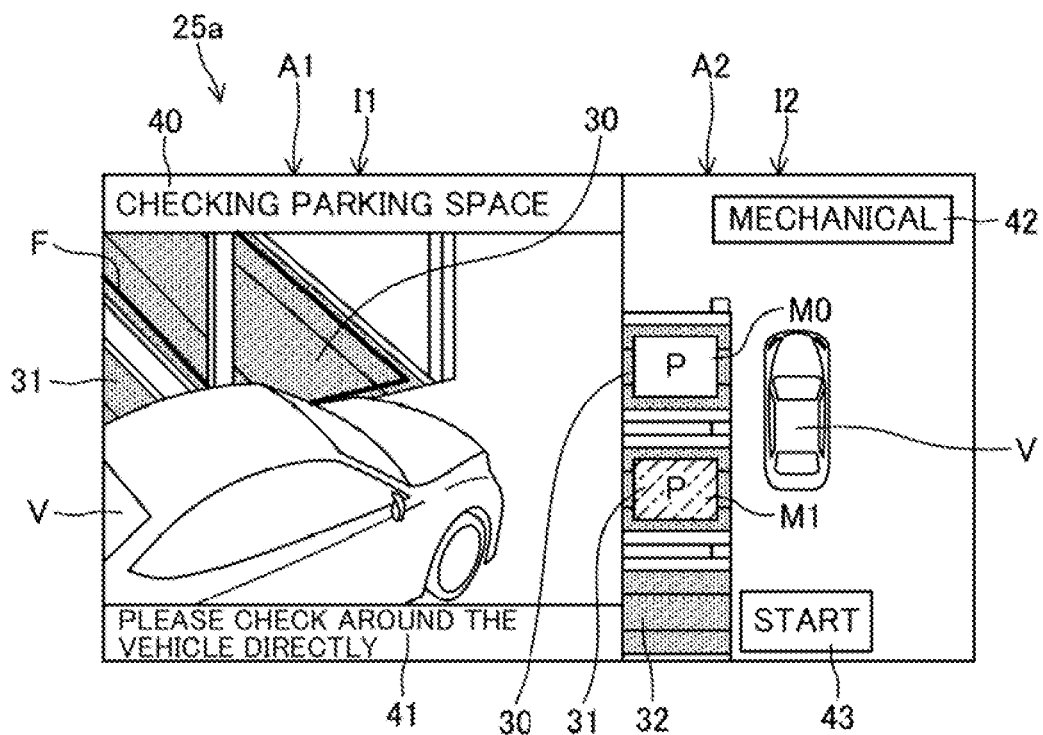
FIG. 4 is a view for illustrating an example of an image displayed on the display screen when the parking control system is activated.

When the parking control system is activated, the ECU 10 highlight-displays, on the display 25a, a parking space closest to the own vehicle V among parking spaces detected as a result of the search as a parking space candidate. FIG. 4 is a view for illustrating an example of an image displayed on the display 25a when the parking control system is activated. As illustrated in FIG. 4, the ECU 10 displays a virtual viewpoint image I1 in the display area A1 of the display 25a, and displays an overhead view image I2 in the display area A2.

The virtual viewpoint image I1 is an image having such a virtual viewpoint as to enable the parking space 30 to be seen over the own vehicle V. The virtual viewpoint image I1 includes a message 40 and a message 41. The ECU 10 displays a message indicating a current situation (in the example of FIG. 4, the message "CHECKING PARKING SPACE") as the message 40, and displays a message for alerting the driver (in the example of FIG. 4, the message "PLEASE CHECK AROUND THE VEHICLE DIRECTLY") as the message 41. In the virtual viewpoint image I1, the parking space 30 is highlight-displayed by a rectangular frame F as the parking space candidate.

The overhead view image I2 includes a display bar 42 for displaying the type of the parking space candidate and a start button 43 (both described later). In the overhead view image I2, the parking space 30 is highlight-displayed by a mark M0 as the parking space candidate. When, as illustrated in FIG. 3, the own vehicle V is stopped not only in the area in front of the parking space 30 but also partially in an area in front of the parking space 31, the ECU 10 determines that there is a possibility that the driver wishes to park in the parking space 31, and highlight-displays the parking space 31 by the mark M1 as the second the parking space candidate. However, the mark M1 is displayed in a less conspicuous manner than the mark M0. The driver can change the parking space in which the driver wishes to park from the parking space 30 to the parking space 31 by touching the mark M1. In this case, the mark M1 becomes the parking space candidate and is highlight-displayed in a more conspicuous manner than the mark M0 set as the second parking space candidate. In addition, the virtual viewpoint image I1 is changed to an image having such a virtual viewpoint as to enable the parking space 31 to be seen over the own vehicle V, and the parking space 31 is highlight-displayed by the frame F.

At this time, the ECU 10 determines whether or not a specific condition is satisfied for the parking space candidate. The specific condition is a condition to be satisfied when the parking space candidate has a relatively narrow width. In this case, there are three types of parking lots, namely, a mechanical parking lot, a non-mechanical regular parking lot, and a non-mechanical narrow-width parking lot.

Figure 5:
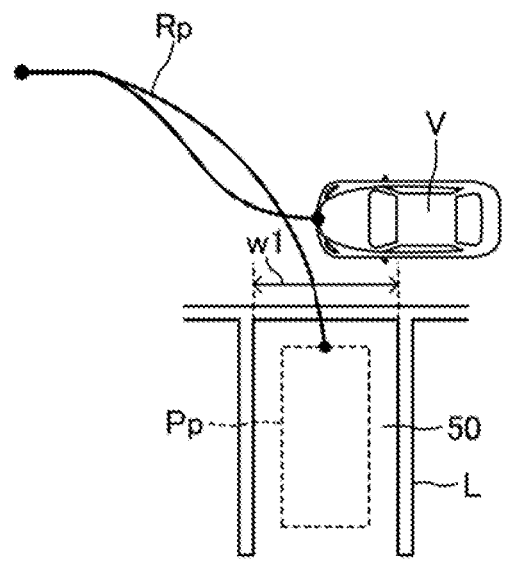
FIG. 5 is a view for illustrating an example of a parking space in a non-mechanical regular parking lot.
Figure 6:
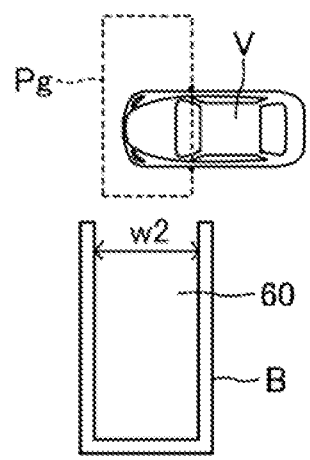
FIG. 6 is a view for illustrating an example of a parking space in a non-mechanical narrow-width parking lot.

The mechanical parking lot refers to a parking lot configured to three-dimensionally store a vehicle by moving a pallet on which the vehicle is placed in a vertical direction and/or planar direction thereof through use of power. The width (front width) of a parking space in a mechanical parking lot is relatively narrow as illustrated in FIG. 3. The non-mechanical regular parking lot refers to a parking lot provided with no pallet, in which a parking space has a width wider than a normal width. FIG. 5 is a view for illustrating a parking space 50 in a non-mechanical regular parking lot. As illustrated in FIG. 5, the parking space 50 is defined by division lines L, and a width w1 therebetween is relatively wide. The non-mechanical narrow-width parking lot refers to a parking lot provided with no pallet, in which a parking space has a relatively narrow width. FIG. 6 is a view for illustrating a parking space 60 in a non-mechanical narrow-width parking lot. As illustrated in FIG. 6, the parking space 60 is defined by blocks B, and a width w2 therebetween is relatively narrow. The blocks B each have such a height as to prevent contact with a door of the vehicle when the door is opened.

A parking space in a mechanical parking lot, a parking space in a non-mechanical regular parking lot, and a parking space in a non-mechanical narrow-width parking lot are hereinafter referred to as "mechanical parking space," "regular parking space," and "narrow-width parking space," respectively.

The ECU 10 determines that the specific condition is satisfied when the parking space candidate is a mechanical parking space or a narrow-width parking space. Specifically, when a pallet is detected from the parking space candidate based on the surrounding information (in particular, image information), the ECU 10 determines that the parking space candidate is a mechanical parking space. Meanwhile, when a pallet is not detected from the parking space candidate, the ECU 10 calculates a width "w" of the parking space candidate based on the surrounding information, and when the width "w" is equal to or smaller than a predetermined width threshold value wth, determines that the parking space candidate is a narrow-width parking space. In those cases, the ECU 10 determines that the specific condition is satisfied. The width threshold value wth is set in advance to be smaller than the width of a parking space having a width equal to or larger than a normal width and equal to or larger than the width of a parking space having a relatively narrow width. In the example of FIG. 3, the ECU 10 determines that the parking space candidate 30 is a mechanical parking space by detecting the pallet 30a from the parking space candidate 30 based on the surrounding information. In the example of FIG. 6, a pallet is not detected from the parking space candidate 60 based on the surrounding information, and hence the ECU 10 calculates the width w2 to find that w2≤wth is satisfied, and therefore determines that the parking space candidate 60 is a narrow-width parking space.

In contrast, when the parking space candidate is a regular parking space, the ECU 10 determines that the specific condition is not satisfied. Specifically, when the width "w" of the parking space candidate is larger than the width threshold value wth in the case in which no pallet is detected from the parking space candidate based on the surrounding information, the ECU 10 determines that the parking space candidate is a regular parking space, and determines that the specific condition is not satisfied. In the example of FIG. 5, a pallet is not detected from the parking space candidate 50 based on the surrounding information, and hence the ECU 10 calculates the width w1 to find that w1>wth is satisfied, and therefore determines that the parking space candidate 50 is a regular parking space.

The ECU 10 displays the type of the parking space candidate in the display bar 42, which is illustrated in FIG. 4, based on a determination result. Specifically, the ECU 10 displays "MECHANICAL" in the display bar 42 when the determination result is "mechanical parking space," displays "REGULAR" in the display bar 42 when the determination result is "regular parking space," and displays "NARROW-WIDTH" in the display bar 42 when the determination result is "narrow-width parking space." This enables the driver to examine the type of the highlight-displayed parking space. In the example of FIG. 4, the ECU 10 displays "MECHANICAL" in the display bar 42.

When the driver wishes to park the own vehicle V in the parking space candidate highlight-displayed on the display 25a, the driver touches the start button 43, which is illustrated in FIG. 4. Then, the ECU 10 determines the parking space candidate as a parking space for which the parking control is to be executed. Then, when the specific condition is satisfied, a movement route Rg for guidance control is generated, and the guidance control is executed. When the specific condition is not satisfied, a movement route Rp for automatic backward parking control is generated, and the automatic backward parking control is executed.

Figure 7:
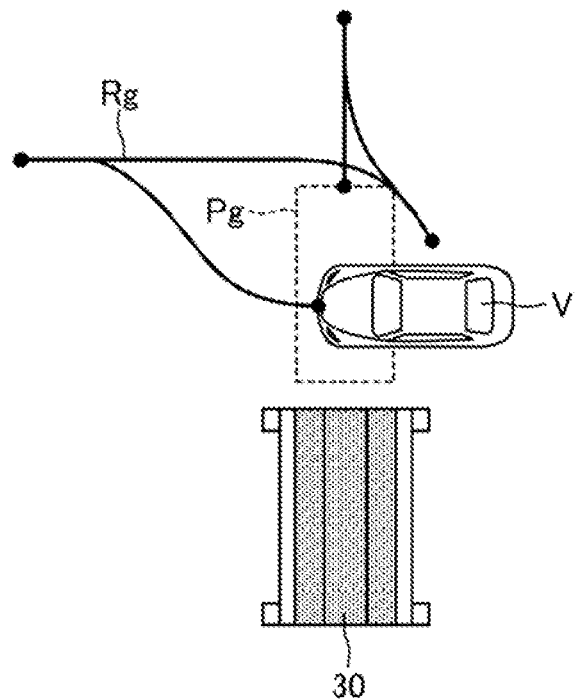
FIG. 7 is a view for illustrating an example of a movement route for guidance control.
Figure 8:
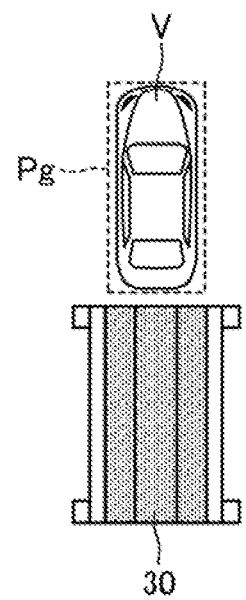
FIG. 8 is a view for illustrating a position of a vehicle with respect to the parking space at an end of the guidance control.

First, the guidance control is described with reference to FIG. 7 and FIG. 8. As illustrated in FIG. 7 and FIG. 8, the guidance control is control for moving the own vehicle V from the current position to a guidance target position Pg along the movement route Rg, and is a kind of backward parking assist control. The guidance target position Pg is set in front (directly in front) of the parking space (mechanical parking space 30 in the example of FIG. 7 and FIG. 8). The guidance control differs from the automatic backward parking control for stopping the own vehicle V in the parking space in that the own vehicle V is stopped at a position in front of the parking space.

The ECU 10 generates the movement route Rg based on the surrounding information as illustrated in FIG. 7 so that, when the own vehicle V stops at the guidance target position Pg, the own vehicle V is brought into a posture in which: the longitudinal axis of the own vehicle V is parallel to the long-side direction of the parking space; the width of the own vehicle V is included in the width of the parking space when viewed from front; and the parking space is in closer proximity to the rear end portion of the own vehicle V than to the front end portion thereof, as illustrated in FIG. 8. This posture is hereinafter also referred to as "ready-to-enter posture." When the movement route Rg cannot be appropriately generated due to, for example, a narrow area in front of the parking space, the ECU 10 informs the driver that the guidance control cannot be started.

After the ECU 10 generates the movement route Rg, the ECU 10 starts the guidance control at a time point at which the driver releases the brake pedal. In the at least one embodiment, the guidance control is executed by the ECU 10 performing drive control, braking control, steering control, and shift control (that is, no parking operation is required to be performed by the driver). However, the ECU 10 may be configured to execute the guidance control by performing at least one of those kinds of control (for example, drive control, braking control, and steering control). During the execution of the guidance control, the ECU 10 displays the traveling direction image in the display area A1 of the display 25a and displays the overhead view image in the display area A2 (not shown). The ECU 10 ends the guidance control at a time point at which the own vehicle V is stopped at the guidance target position Pg as illustrated in FIG. 8, and informs the driver to that effect by a message, voice, or the like.

Next, the automatic backward parking control is described with reference to FIG. 5. As illustrated in FIG. 5, the automatic backward parking control is well-known control for moving the own vehicle V from the current position to a target parking position Pp along the movement route Rp so that the own vehicle V enters the parking space from the rear end portion. The ECU 10 sets the target parking position Pp in the parking space (regular parking space 50 in the example of FIG. 5) and generates the movement route Rp based on the surrounding information.

After the ECU 10 generates the movement route Rp, the ECU 10 starts the automatic backward parking control at a time point at which the driver releases the brake pedal. During the execution of the control, the ECU 10 displays the traveling direction image in the display area A1 of the display 25a and displays the overhead view image in the display area A2 (not shown). The ECU 10 ends the automatic backward parking control at a time point at which the own vehicle V is stopped at the target parking position Pp, and informs the driver to that effect by a message, voice, or the like. In the at least one embodiment, when the specific condition is not satisfied, the automatic backward parking control is executed. However, any type of parking control may be employed as long as the own vehicle V is moved from the current position to the target parking position. For example, automatic forward parking control may be executed, or parking assist control in which only driving control, braking control, and steering control are executed (that is, shift control is not executed) may be executed.

As described above, the own vehicle V does not enter the parking space under the guidance control, and hence after the end of the guidance control, the driver reverses the own vehicle V from the guidance target position Pg by his or her own parking operation, to thereby park the own vehicle V in the parking space. The own vehicle V is stopped in the ready-to-enter posture, thereby greatly reducing a burden on the driver in the parking operation after the guidance control. However, it is impossible to examine the position of rear wheels of the own vehicle V and a surrounding situation thereof while reversing, and hence in order to further reduce the burden on the driver, it is desired that the driver be able to examine the position of the rear wheels and the surrounding situation thereof while reversing.

In view of this, the ECU 10 is configured to start, when the driver starts to reverse from the guidance target position Pg after the end of the guidance control (first case), the see-through display control for visually assisting the driver in the parking operation. The see-through display control is control for displaying, on the display 25a, a composite traveling direction image I3st including a transparency-processed vehicle rear portion Vr (described later) and a transparent vehicle overhead view image I2st including a plane image of a transparency-processed vehicle, and is a kind of backward parking assist control.

Figure 9:
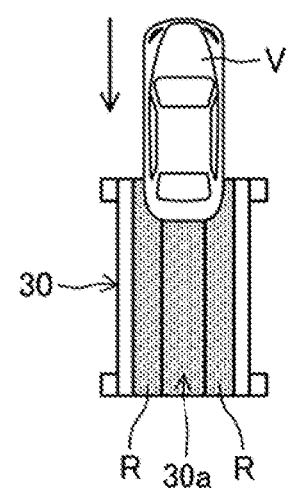
FIG. 9 is a view for illustrating an example of a scene in which see-through display control is being executed.
Figure 10:
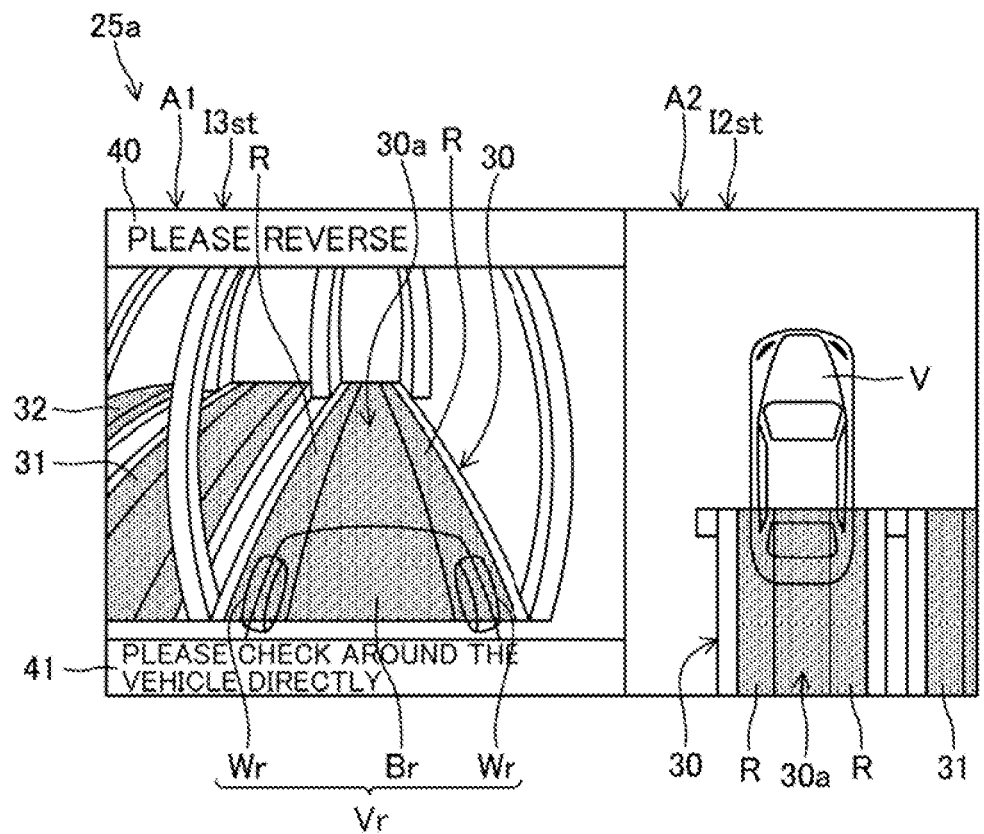
FIG. 10 is a view for illustrating an image displayed on the display screen at a time point at which the vehicle passes through a position illustrated in FIG. 9.

FIG. 9 is a view for illustrating an example of a scene in which the see-through display control is being executed, and FIG. 10 is a view for illustrating an image displayed on the display 25a at a time point at which the own vehicle V passes through a position illustrated in FIG. 9. As illustrated in FIG. 10, the ECU 10 displays the composite traveling direction image I3st in the display area A1 of the display 25a in place of the traveling direction image, and displays the transparent vehicle overhead view image I2st in the display area A2 in place of the overhead view image I2.

First, the composite traveling direction image I3st is described. The composite traveling direction image I3st includes the message 40 and the message 41. As the message 40, the ECU 10 displays a message indicating an instruction for the driver (in the example of FIG. 10, the message "PLEASE REVERSE"), and as the message 41, displays the same message as in FIG. 4. The composite traveling direction image I3st also includes the vehicle rear portion Vr. The vehicle rear portion Vr is a portion cut out from the image of the vehicle stored in advance in the ROM of the ECU 10, and is formed of a rear end portion Br and rear wheels Wr of the own vehicle V. The movement of the vehicle rear portion Vr is linked to the movement of the own vehicle V. For example, when the rear wheels of the own vehicle V are being steered, the rear wheels Wr of the vehicle rear portion Vr are displayed as being steered on the composite traveling direction image I3st.

As described above, the ECU 10 acquires the image information from the camera sensor 11 every time the predetermined time period has elapsed. The ECU 10 is configured to store, in an own RAM thereof for a predetermined period T, traveling direction images generated based on at least the rearward image data among the respective pieces of image data included in the image information. The composite traveling direction image I3st is generated in the following manner. That is, the ECU 10 first transparency-processes the vehicle rear portion Vr. Subsequently, a traveling direction image (hereinafter also referred to as "past traveling direction image") generated at a time point earlier than a current time point by a specific period Tspe (described later) is read out from the RAM. Subsequently, the transparency-processed vehicle rear portion Vr is superimposed on a position corresponding to the position of the own vehicle V at the current time point in the past traveling direction image. Subsequently, the composite traveling direction image I3st is generated by seamlessly compositing the traveling direction image generated at the current time point and the past traveling direction image including the transparency-processed vehicle rear portion Vr. The composite traveling direction image I3st corresponds to an example of "composite rearward image."

Now, the specific period is described. As the own vehicle V reverses, a rear portion of the own vehicle V gradually enters the rearward area the image of which is acquired by the camera sensor 11b at a certain time point Tpa. Then, at a certain time point Tpre, a portion of the own vehicle V that has entered the rearward area corresponds to the vehicle rear portion Vr. A difference (<(period T)) between the time point Tpre and the time point Tpa corresponds to the specific period Tspe.

Next, the transparent vehicle overhead view image I2st is described. The ECU 10 generates the transparent vehicle overhead view image I2st by transparency-processing the plane image of the vehicle included in the overhead view image I2.

Incidentally, the ECU 10 determines whether or not a door mirror closing condition is satisfied during a period in which the vehicle is traveling. The door mirror closing condition is a condition to be satisfied when there is a possibility that door mirrors (not shown) of the own vehicle V may be brought into contact with an obstacle (for example, pole in a mechanical parking lot), and it is determined whether or not the door mirror closing condition is satisfied based on the surrounding information. When the door mirror closing condition is satisfied, the ECU 10 automatically closes (retracts) the door mirrors (not shown). Thus, the door mirrors change from an open state to a closed state.

During a period in which the own vehicle is reversing, the driver examines a situation on sides of the own vehicle V by looking at the door mirrors. Therefore, when the door mirror closing condition is satisfied and the door mirrors are closed, it becomes difficult to examine the situation on the sides of the own vehicle V. In view of this, after the end of the guidance control, the ECU 10 executes the enlarged display control for visually assisting the driver in the parking operation when the driver starts to reverse from the guidance target position Pg with the door mirror closing condition being satisfied. The enlarged display control is control for displaying, on the display 25a, the plane image of the vehicle in the overhead view image I2 and an enlarged overhead view image I2mag obtained by enlarging a vicinity thereof, and is a kind of backward parking assist control.

Figure 11:
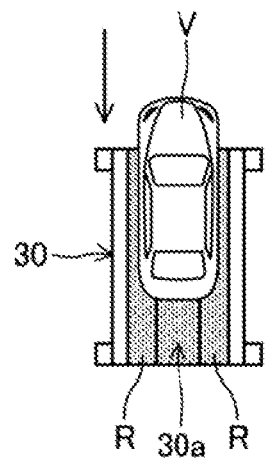
FIG. 11 is a view for illustrating an example of a scene in which enlarged display control is being executed.
Figure 12:
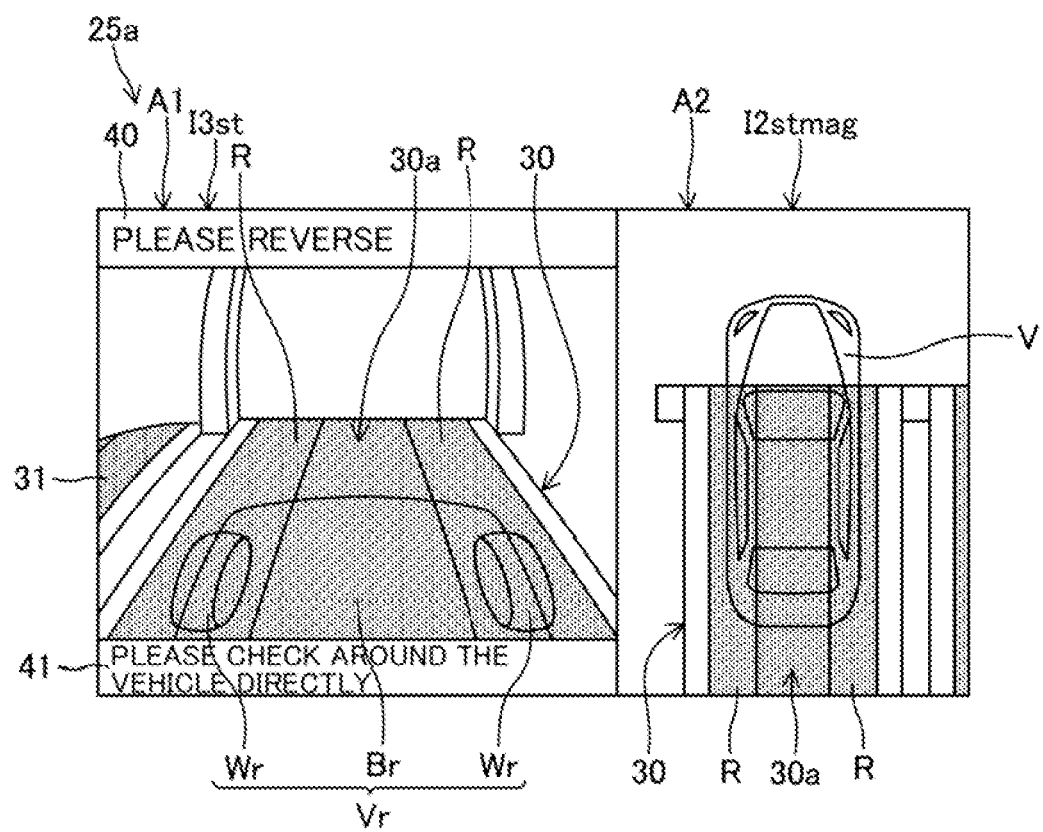
FIG. 12 is a view for illustrating an image displayed on the display screen at a time point at which the vehicle passes through a position illustrated in FIG. 11.

FIG. 11 is a view for illustrating an example of a scene in which the enlarged display control is being executed, and FIG. 12 is a view for illustrating an image displayed on the display 25a at a time point at which the own vehicle V passes through a position illustrated in FIG. 11. As illustrated in FIG. 12, the ECU 10 displays the composite traveling direction image I3st in the display area A1 of the display 25a in place of the traveling direction image, and displays the enlarged overhead view image I2mag in the display area A2 in place of the overhead view image I2. In the at least one embodiment, the see-through display control is executed, and hence the enlarged overhead view image I2mag is generated based on the transparent vehicle overhead view image I2st. The enlarged overhead view image I2mag displayed on the display 25a during the execution of the see-through display control is hereinafter referred to as "transparent vehicle enlarged overhead view image I2stmag."

The ECU 10 cuts out a range including a vehicle plane image and a vicinity thereof (in particular, sides of the plane image) from the overhead view image I2 (transparent vehicle overhead view image I2st during the execution of the see-through display control), and increases a display magnification so that the cut-out range matches a size of the display area A2. Thus, the enlarged overhead view image I2mag (transparent vehicle enlarged overhead view image I2stmag during the execution of the see-through display control) is generated. The camera sensors 11c and 11d are provided at lower portions of the door mirrors, and hence imaging angles of the camera sensors 11c and 11d are changed when the door mirrors are closed. For that reason, the ECU 10 corrects the rightward image data and the leftward image data that are acquired after a time point at which the door mirrors are closed to image data corresponding to the imaging angles of the camera sensors 11c and 11d that are set before the door mirrors are closed. This enables the enlarged overhead view image I2mag to be appropriately generated even when the door mirrors are closed.

(Specific Operation)

Figure 13:
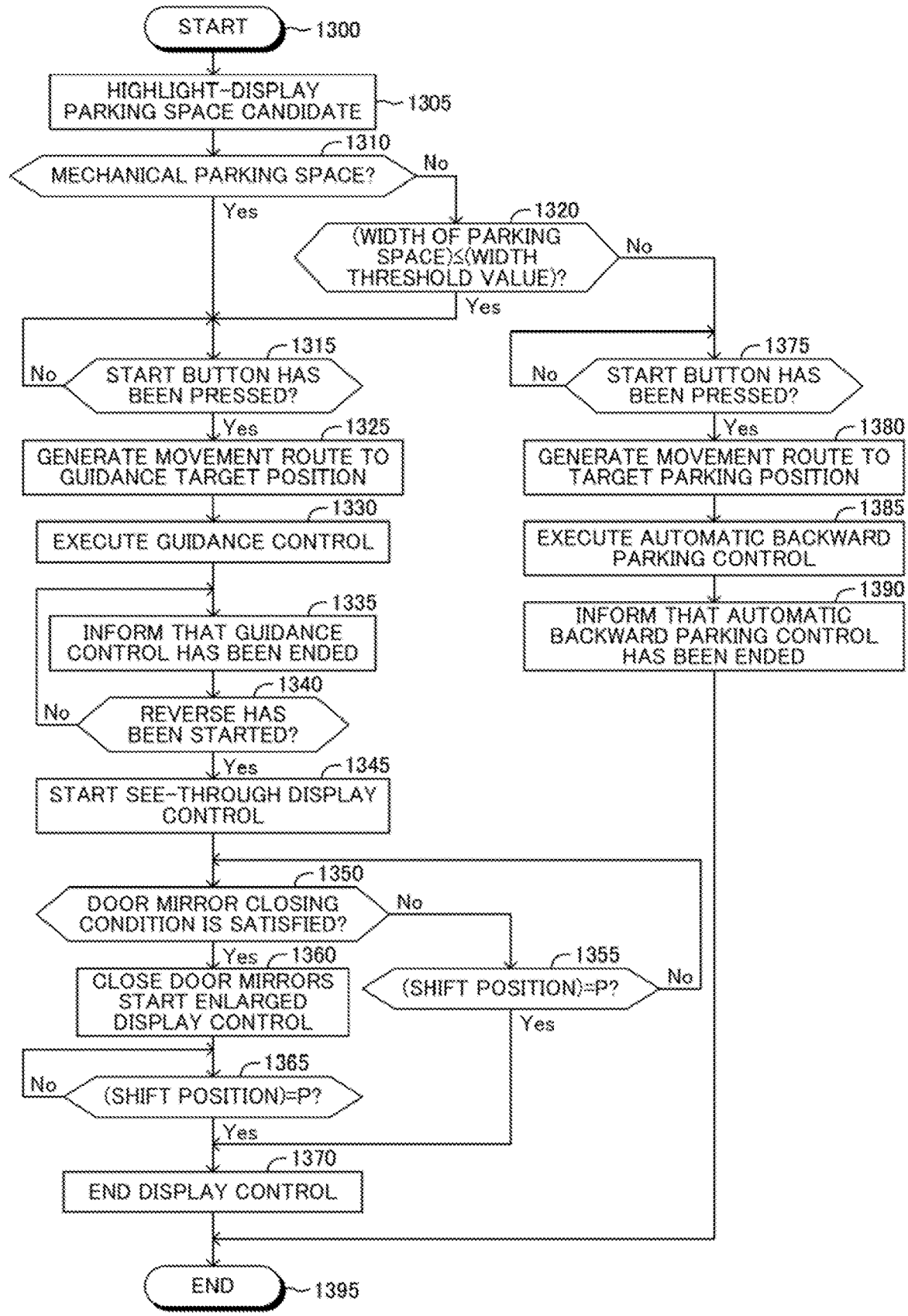
FIG. 13 is a flow chart for illustrating a routine to be executed by a CPU of a parking control ECU (10) included in the parking control apparatus.

Next, a specific operation of the ECU 10 is described. The CPU of the ECU 10 is configured to execute a routine illustrated in FIG. 13 by a flow chart when the parking control system is activated. The parking control system is activated when the activation switch 13 is pressed by the driver of the own vehicle V pulled up alongside the area in front of the parking space.

The CPU starts the process from Step 1300, and in Step 1305, highlight-displays a parking space closest to the own vehicle V as a parking space candidate on the display 25a. Subsequently, the CPU advances the process to Step 1310 to determine whether or not the parking space candidate is a mechanical parking space based on the surrounding information (in particular, image information).

When the parking space candidate is a mechanical parking space (Yes in Step 1310), the CPU advances the process to Step 1315 (described later). Meanwhile, when the parking space candidate is not a mechanical parking space (No in Step 1310), the CPU advances the process to Step 1320 to calculate the width "w" of the parking space candidate based on the surrounding information and determine whether or not the width "w" is equal to or smaller than the width threshold value wth. When w≤wth is satisfied (Yes in Step 1320), the CPU determines that the parking space candidate is a narrow-width parking space, and advances the process to Step 1315.

In Step 1315, the CPU determines whether or not the start button 43 displayed on the display 25a as illustrated in FIG. 4 has been pressed by the driver. When the start button 43 has not been pressed (No in Step 1315), the CPU again performs the determination in Step 1315. When the start button 43 is pressed in the midst of the process (Yes in Step 1315), the CPU determines the parking space candidate as the parking space for which the parking control is to be executed, and advances the process to Step 1325.

In Step 1325, the CPU generates the movement route Rg from the current position to the guidance target position Pg based on the surrounding information as illustrated in FIG. 7. Subsequently, at the time point at which the driver releases the brake pedal, the CPU advances the process to Step 1330 to execute the guidance control for automatically moving the own vehicle V to the guidance target position Pg along the movement route Rg as illustrated in FIG. 8. After that, the CPU advances the process to Step 1335 to inform the driver that the guidance control has been ended, and advances the process to Step 1340.

In Step 1340, the CPU determines whether or not the own vehicle has started to reverse based on signals acquired from a shift position sensor and a vehicle speed sensor (both not shown). When the reverse has not been started yet (No in Step 1340), the CPU again performs the processing step of Step 1335. When the own vehicle starts to reverse in the midst of the process (Yes in Step 1340), the CPU advances the process to Step 1345 to start the see-through display control as illustrated in FIG. 10.

Subsequently, the CPU advances the process to Step 1350 to determine whether or not the door mirror closing condition is satisfied based on the surrounding information. When the door mirror closing condition is not satisfied (No in Step 1350), the CPU advances the process to Step 1355 to determine whether or not a shift position is "P" based on the signal acquired from the shift position sensor. When the shift position is not "P" (No in Step 1355), the CPU determines that the own vehicle V is still reversing, and again performs the determination in Step 1350. When the door mirror closing condition is satisfied in the midst of the process (Yes in Step 1350), the CPU advances the process to Step 1360 to automatically close (retract) the door mirrors and start the enlarged display control as illustrated in FIG. 12.

Subsequently, the CPU advances the process to Step 1365 to determine whether or not the shift position is "P". When the shift position is not "P" (No in Step 1365), the CPU determines that the own vehicle V is still reversing, and again performs the determination in Step 1365. When the shift position becomes "P" in the midst of the process (Yes in Step 1365), the CPU determines that the parking operation performed by the driver is completed, and advances the process to Step 1370 to end the see-through display control and the enlarged display control. After that, the CPU ends this routine in Step 1395.

Meanwhile, when the shift position becomes "P" (Yes in Step 1355) while the door mirror closing condition is not satisfied (No in Step 1350), the CPU determines that the parking operation performed by the driver is completed, and advances the process to Step 1370 to end the see-through display control. After that, the CPU ends this routine in Step 1395.

Meanwhile, when w>wth is established (No in Step 1320), the CPU determines that the parking space candidate is a regular parking space, and advances the process to Step 1375 to determine whether or not the start button 43 has been pressed by the driver. When the start button 43 has not been pressed (No in Step 1375), the CPU again performs the determination in Step 1375. When the start button 43 is pressed in the midst of the process (Yes in Step 1375), the CPU determines the parking space candidate as the parking space for which the parking control is to be executed, and advances the process to Step 1380.

In Step 1380, the CPU generates the movement route Rp from the current position to the target parking position Pp based on the surrounding information as illustrated in FIG. 5. Subsequently, at the time point at which the driver releases the brake pedal, the CPU advances the process to Step 1385 to execute the automatic backward parking control for automatically moving the own vehicle V to the target parking position Pp along the movement route Rp. After that, the CPU advances the process to Step 1390 to inform the driver that the automatic backward parking control has been ended, and ends this routine in Step 1395. That is, when the automatic backward parking control is executed, the see-through display control and the enlarged display control are not executed.

As described above, when the detected parking space is a mechanical or narrow-width parking space (that is, when the parking space has a relatively narrow width), instead of avoiding the execution of the parking control, the apparatus according to the at least one embodiment executes the guidance control for moving the own vehicle V to a position (guidance target position) from which the driver can park the own vehicle V only by performing a simple parking operation. This can greatly reduce the burden on the driver in parking the own vehicle V backward in the parking space having a relatively narrow width without introducing the camera sensor 11 or clearance sonar 12 having higher detection accuracy.

In particular, in order for the driver to park in a mechanical or narrow-width parking space by his or her own parking operation, it is required to stop the own vehicle V at a position in front of the parking space in the ready-to-enter posture. Thus, when the area in front of the mechanical or narrow-width parking space is narrow, the driver is required to repeatedly perform turning back in the narrow area to adjust the position and posture of the own vehicle V, thereby further increasing the burden in the parking operation. With the apparatus according to the at least one embodiment, as long as the area in front has a size that enables the movement route Rg to be set therein, the own vehicle V is stopped at the guidance target position in the ready-to-enter posture by the guidance control. Therefore, the apparatus according to the at least one embodiment is useful particularly when the area in front of the mechanical or narrow-width parking space is narrow.

In addition, in the apparatus according to the at least one embodiment, when the detected parking space is a regular parking space (that is, when the parking space has a width equal to or larger than a normal width), the automatic backward parking control is executed. In this manner, the kind of parking control is switched based on the type of the detected parking space, to thereby be able to execute appropriate parking control corresponding to the width of the parking space.

Further, in the apparatus according to the at least one embodiment, the see-through display control is executed when the own vehicle V starts to reverse after the end of the guidance control. Thus, the driver can visually recognize an area immediately below the rear portion of the own vehicle V by referring to the composite traveling direction image I3st, to thereby be able to examine the position of the rear wheels and the surrounding situation thereof. The driver can also visually recognize the area immediately below the rear portion of the own vehicle V by referring to the transparent vehicle overhead view image I2st, to thereby be able to examine the relative position of the rear wheels in the parking space and the like. As a result, it is possible to further reduce the burden on the driver in parking the own vehicle V backward in the parking space having a relatively narrow width. Particularly in the case of parking in a mechanical parking space, it is possible to examine the relative position of the rear wheels within the rails R of the pallet, thereby facilitating the parking operation.

Further, the apparatus according to the at least one embodiment executes the enlarged display control when the door mirror closing condition is satisfied in the case in which the own vehicle V has started to reverse after the end of the guidance control. Thus, the driver can examine the situation on the sides of the own vehicle V in the parking space by referring to the enlarged overhead view image I2mag. This enables the driver to perform the parking operation without feeling a heavy burden even with the door mirrors being closed. Particularly in the case of parking in a mechanical parking space, it is possible to examine clearances between side surfaces of a vehicle body of the own vehicle V and the rails R of the pallet, thereby facilitating the parking operation.

Modification Example

Next, a parking control apparatus according to a modification example of the present invention (hereinafter also referred to as "the apparatus according to this modification example") is described. This modification example differs from the at least one embodiment in that the parking control system has a parking space registration function. The parking space registration function is described below, and then the parking control for a registered parking space is described.

The parking space registration function is a function of storing (registering) a parking space in advance in the ROM of the ECU 10 and, when the registered parking space is detected after the registration, executing the parking control for this parking space. Specifically, when the driver wishes to register a certain parking space, the driver stops the own vehicle V near the certain parking space (by stepping on the brake pedal), and presses the activation switch 13 to activate the parking control system. Then, under a state in which the parking space candidate that the driver wishes to register is highlight-displayed, the driver presses a register button (not shown) displayed on the display 25*a*. Then, the ECU 10 determines the parking space candidate as a parking space to be registered, and in order to prompt the driver to select the type of the parking space (from among "MECHANICAL," "REGULAR," and "NARROW-WIDTH"), displays a list of those types on the display 25*a*.

When the type of the parking space is selected by the driver, the ECU 10 executes the parking control corresponding to the selected type of the parking space. That is, when the type of "MECHANICAL" or "NARROW-WIDTH" is selected by the driver, the ECU 10 sets the guidance target position Pg to a position in front of the parking space, generates the movement route Rg, and executes the guidance control. When the guidance control is ended and the driver starts to reverse, the ECU 10 starts the see-through display control, and also starts the enlarged display control with the satisfaction of the door mirror closing condition as a trigger. When the driver finishes performing the parking operation for the parking space, the ECU 10 ends those kinds of display control. At this time, the ECU 10 extracts a plurality of feature points of a road surface around the parking space, and stores coordinates of those feature points and the type (in this example, "MECHANICAL" or "NARROW-WIDTH") of the parking space selected by the driver in association with the parking space (in the ROM of the ECU 10). The parking space is thus registered as the mechanical parking space or the narrow-width parking space. The parking space that has been registered is hereinafter also referred to as "registered parking space." The feature point refers to a point having a predetermined pixel size that enables extraction from a picked-up image of the ground and satisfying predetermined conditions in brightness and tone.

Meanwhile, when the type of "REGULAR" is selected by the driver, the ECU 10 sets the target parking position Pp in the parking space, generates the movement route Rp, and executes the automatic backward parking control. When the automatic backward parking control is ended, the ECU 10 extracts a plurality of feature points of the road surface around the parking space, and stores, in association with the parking space, the coordinates of those feature points and the type (in this example, "REGULAR") of the parking space selected by the driver. The parking space is thus registered as the regular parking space.

When the registration button is pressed by the driver, the ECU 10 determines the type of the parking space based on the surrounding information. Then, when the parking space is a mechanical or narrow-width parking space, two types of "MECHANICAL" and "NARROW-WIDTH" are displayed on the display 25a in a selectable manner, while the type of "REGULAR" is displayed in a non-selectable manner (or not displayed). This is because the ECU 10 is configured to avoid executing automatic parking control for a mechanical or narrow-width parking space. However, there is no problem in registering the mechanical parking space as a narrow-width parking space or registering the narrow-width parking space as a mechanical parking space. Meanwhile, when the parking space is a regular parking space, the ECU 10 displays all the types on the display 25a in a selectable manner. In this case, the driver may register the regular parking space as a mechanical parking space or as a narrow-width parking space.

Figure 14:
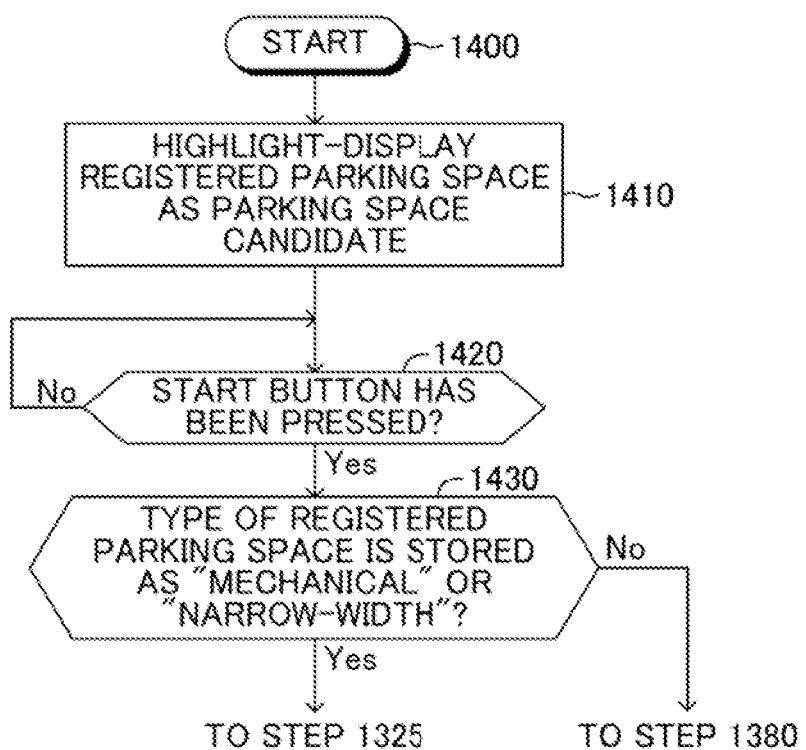
FIG. 14 is a flow chart for illustrating a routine to be executed by a CPU of a parking control ECU included in a parking control apparatus according to a modification example of the present invention.

Next, the parking control for the registered parking space is described with reference to FIG. 14. In a case in which there is a registered parking space stored in the ROM, during a period of traveling slowly at a speed equal to or lower than a speed threshold value, the ECU 10 performs processing of detecting the feature points stored in the ROM based on the image information simultaneously with processing of detecting a parking space based on the surrounding information. When the feature points are detected, the CPU acquires (reads out) the type of the registered parking space stored in association with those feature points.

At a time point at which the driver pulls up the own vehicle V alongside an area in front of the registered parking space, the CPU has already performed the above-mentioned processing and acquired the type of the registered parking space. When the activation switch 13 is pressed by the driver and the parking control system is activated, the CPU starts the process from Step 1400, and in Step 1410, highlight-displays the registered parking space as a parking space candidate on the display 25a. Subsequently, the CPU advances the process to Step 1420 to determine whether or not the start button displayed on the display 25a has been pressed by the driver. When the start button has not been pressed (No in Step 1420), the CPU again performs the determination in Step 1420. When the start button is pressed in the midst of the process (Yes in Step 1420), the CPU determines the parking space candidate as the parking space for which the parking control is to be executed, and advances the process to Step 1430.

In Step 1430, the CPU determines whether or not the type of the registered parking space is stored as "MECHANICAL" or "NARROW-WIDTH." As described above, the CPU has acquired the type of the registered parking space at a time point at which the feature points are detected, and therefore performs the determination based on the acquired type. When the type of the registered parking space is stored as "MECHANICAL" or "NARROW-WIDTH" (Yes in Step 1430), the CPU performs the processing steps of Step 1325 and the subsequent steps of FIG. 13 (namely, guidance control, see-through display control, and enlarged display control), and in Step 1395, ends this routine. Meanwhile, when the type of the registered parking space is stored as "REGULAR" (No in Step 1430), the CPU performs the processing steps of Step 1380 and the subsequent steps of FIG. 13 (namely, automatic backward parking control), and in Step 1395, ends this routine. In this modification example, a condition that "the type of the registered parking space is stored as 'MECHANICAL' or 'NARROW-WIDTH'" corresponds to an example of the specific condition.

In this modification example, when the detected parking space is a registered parking space, the ECU 10 avoids performing processing of determining the type of this parking space, and reads out the type of the parking space stored at a time of registration of the registered parking space to execute the parking control corresponding to this type. The above-mentioned configuration can also exhibit the same actions and effects as those of the apparatus according to the at least one embodiment.

In the above, the parking control apparatus according to the at least one embodiment and the modification example has been described, but the present invention is not limited to the above-mentioned at least one embodiment and modification example. Various changes are possible within the range not departing from the object of the present invention.

For example, the type of the parking space may be selected by the driver. Specifically, when the parking control system is activated, the ECU 10 highlight-displays the detected parking space candidates and displays a list of buttons representing types of this parking space candidate on the display 25a. When the driver presses any one of the buttons to select a type, the ECU 10 executes the parking control (guidance control or automatic backward parking control) corresponding to the selected type. However, when the parking space candidate is a mechanical or narrow-width parking space, the button representing the type of "REGULAR" is inhibited from being displayed.

The present invention can also be applied to a vehicle traveling by autonomous driving (by autonomous driving control).

What is claimed is:

1. A parking control apparatus, comprising:
   an image pickup device configured to capture an image of surroundings of a vehicle;
   a 3D object information acquisition device configured to acquire information on a 3D object present in the surroundings of the vehicle as 3D object information;

a display screen; and a control unit configured to:

detect a parking space, which is a space having a shape and a size that enable the vehicle to be parked therein, based on surrounding information including: image information including image data obtained by capturing the image by the image pickup device; and the 3D object information; and execute parking control including backward parking assist control for assisting a driver of the vehicle in parking the vehicle backward in the detected parking space, wherein the control unit is further configured to:

determine, when the parking space is detected, whether a specific condition has been satisfied, the specific condition corresponding to whether the parking space has a width not greater than a predetermined narrow width threshold value;

execute, when the control unit has determined that the specific condition is satisfied, guidance control as the backward parking assist control based on the surrounding information, the guidance control being control for moving the vehicle from a current position to a guidance target position, which is a position in front of the detected parking space, so that the vehicle stops at the guidance target position in a posture in which: a longitudinal axis of the vehicle is parallel to a long-side direction of the detected parking space; a width of the vehicle is included in the width of the detected parking space when viewed from front; and the detected parking space is in closer proximity to a rear end portion of the vehicle than to a front end portion of the vehicle;

generate, during a period in which the vehicle is reversing it a speed equal to or lower than a predetermined speed threshold value, an overhead view image obtained by superimposing a vehicle plane image on an image of a surrounding area of the vehicle that appears as being viewed from directly above, based on the image information, and display the overhead view image in a predetermined second area of the display screen; and execute, in a case in which the vehicle has started to reverse from the guidance target position by a parking operation of the driver after execution of the guidance control due to satisfaction of the specific condition, enlarged display control as the backward parking assist control with a change of door mirrors of the vehicle from an open state to a closed state as a trigger, the enlarged display control being control for generating an enlarged overhead view image, which is an image obtained by enlarging the vehicle plane image and a vicinity thereof by increasing a display magnification of the overhead view image, and displaying the enlarged overhead view image in the predetermined second area in place of the overhead view image.

2. The parking control apparatus according to claim 1, wherein the control unit is further configured to execute, when the control unit has determined that the specific condition is not satisfied, as the parking control, control for moving the vehicle from the current position to a target parking position, which is a position in the detected parking space, based on the surrounding information.

3. The parking control apparatus according to claim 1, wherein the control unit is further configured to:

determine, based on at least the image information, whether the detected parking space is a mechanical parking space, which is a parking space in a mechanical parking lot; and determine that the specific condition is satisfied when the control unit has determined that the detected parking space is the mechanical parking space.

4. The parking control apparatus according to claim 3, wherein the control unit is further configured to:

determine, when the control unit has determined that the detected parking space is not the mechanical parking space, based on at least the image information, whether the detected parking space has a width equal to or smaller than a predetermined width threshold value; and determine that the specific condition is satisfied when the control unit has determined that the detected parking space has a width equal to or smaller than the predetermined width threshold value.

5. The parking control apparatus according to claim 1, wherein the control unit is further configured to:

generate, during a period in which the vehicle is reversing at a speed equal to or lower than a predetermined speed threshold value, a rearward image including a rearward area of the vehicle based on the image information, and display the rearward image in a predetermined first area of the display screen; and execute, in a first case in which the vehicle has started to reverse from the guidance target position by a parking operation of the driver after execution of the guidance control due to satisfaction of the specific condition, see-through display control as the backward parking assist control, the see-through display control being control for generating a composite rearward image obtained by compositing the rearward image and an image including a transparency-processed vehicle rear portion, which is formed of the rear end portion and rear wheels of the vehicle, and displaying the composite rearward image in the predetermined first area in place of the rearward image.

6. The parking control apparatus according to claim 5, wherein the control unit is configured to:

further execute, in the first case, as the see-through display control, control for generating a transparent vehicle overhead view image, which is the overhead view image having the vehicle plane image transparency-processed, and displaying the transparent vehicle overhead view image in the predetermined second area in place of the overhead view image.

* * * * *